United States Patent
Yuan et al.

(10) Patent No.: US 10,924,413 B2
(45) Date of Patent: Feb. 16, 2021

(54) TRANSMISSION PATH DETERMINING METHOD AND APPARATUS

(71) Applicant: Huawei Technologies Co., Ltd., Shenzhen (CN)

(72) Inventors: Feng Yuan, Nanjing (CN); Hong Zhang, Hong Kong (CN); Kai Chen, Hong Kong (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/452,821

(22) Filed: Jun. 26, 2019

(65) Prior Publication Data

US 2019/0319882 A1    Oct. 17, 2019

Related U.S. Application Data

(63) Continuation of application No. PCT/CN2017/109372, filed on Nov. 3, 2017.

(30) Foreign Application Priority Data

Dec. 27, 2016 (CN) .......................... 201611229376.5

(51) Int. Cl.
*H04L 12/803* (2013.01)
*H04L 12/801* (2013.01)

(52) U.S. Cl.
CPC ............ *H04L 47/125* (2013.01); *H04L 47/11* (2013.01); *H04L 47/193* (2013.01)

(58) Field of Classification Search
None
See application file for complete search history.

(56) References Cited

U.S. PATENT DOCUMENTS

| | | | |
|---|---|---|---|
| 2004/0170126 A1* | 9/2004 | Chuang | H04L 47/33 370/230 |
| 2005/0259570 A1* | 11/2005 | Hayashi | H04L 45/00 370/216 |

(Continued)

FOREIGN PATENT DOCUMENTS

| | | |
|---|---|---|
| CN | 101335714 A | 12/2008 |
| CN | 102025644 A | 4/2011 |

(Continued)

OTHER PUBLICATIONS

Alizadeh, Mohammad, et al., "CONGA: Distributed Congestion-Aware Load Balancing for Datacenters", SIGCOMM'14, Aug. 17-22, 2014, Chicago, IL, USA. Total 12 pages.

(Continued)

*Primary Examiner* — Brian S Roberts
(74) *Attorney, Agent, or Firm* — Slater Matsil, LLP

(57) ABSTRACT

Embodiments of this application provide a transmission path determining method and apparatus, where the method includes: determining that a current path corresponding to a flow to which a to-be-transmitted packet belongs is congested; and determining a target path for the to-be-transmitted packet based on a path congestion information table, and adding information about the target path to the to-be-transmitted packet, so as to transmit the to-be-transmitted packet based on the target path, where a congestion degree of the target path is less than a congestion degree of the current path, each entry of the path congestion information table includes a transmission path and congestion information corresponding to the transmission path, and the congestion information is used to indicate a congestion degree of the transmission path.

20 Claims, 6 Drawing Sheets

(56) References Cited

U.S. PATENT DOCUMENTS

| | | | |
|---|---|---|---|
| 2009/0303882 A1* | 12/2009 | Tanaka | H04L 47/283 370/237 |
| 2010/0284270 A1* | 11/2010 | Xue | H04L 69/40 370/225 |
| 2014/0040526 A1* | 2/2014 | Chang | H04L 43/0882 710/316 |
| 2015/0127797 A1 | 5/2015 | Attar et al. | |
| 2015/0146526 A1* | 5/2015 | Kulkarni | H04L 47/125 370/230.1 |
| 2015/0334024 A1* | 11/2015 | Mogul | H04L 47/30 370/237 |
| 2017/0048144 A1* | 2/2017 | Liu | H04L 12/413 |
| 2017/0338976 A1 | 11/2017 | Wang et al. | |

FOREIGN PATENT DOCUMENTS

| | | |
|---|---|---|
| CN | 103051546 A | 4/2013 |
| CN | 106230722 A | 12/2016 |
| WO | 2016124049 A1 | 8/2016 |
| WO | 2017180731 A1 | 10/2017 |

OTHER PUBLICATIONS

Katta, Naga et al., "CLOVE : How I Learned to Stop Worrying About the Core and Love the Edge", Proceedings of he 15th ACM Workshop on Hot Topics in Networks, HotNets-XV, Nov. 9-10, 2016, pp. 155-161, XP055633258.

Sharma, Kapil et al., "FlowFurl: A Flow-level Routing for Faulty Data Center Networks", IEEE International Conference on Advanced Networks and Telecommunications Systems (ANTS), Nov. 6, 2016, pp. 1-6, XP033105687.

* cited by examiner

TRANSMISSION PATH DETERMINING METHOD AND APPARATUS

CROSS-REFERENCE TO RELATED APPLICATIONS

This application is a continuation of International Application No. PCT/CN2017/109372, filed on Nov. 3, 2017, which claims priority to Chinese Patent Application No. 201611229376.5, filed on Dec. 27, 2016. The disclosures of the aforementioned applications are hereby incorporated by reference in their entireties.

TECHNICAL FIELD

Embodiments of this application relate to the field of communications, and more specifically, to a transmission path determining method and apparatus.

BACKGROUND

Internet data is exploding. A quantity of registered Sina Weibo users in China has exceeded 300 million. A quantity of active users of instant messaging tools of Tencent has reached 710 million. A quantity of Facebook users worldwide is approaching 1 billion, second only to populations of China and India. Data generated only by social networks is already staggering. According to the report "Digital Universe Study 2011" published by International Data Corporation (IDC), a total amount of global information doubles every two years. In 2011 alone, a total amount of data created and replicated worldwide was 1.8 ZB (that is, 1.8 trillion GB), and has risen by more than 1 ZB over the same period in 2010; this value will increase to 35 ZB by 2020. Emergence of big data is driving enterprises to continuously improve data center-based data processing capabilities of the enterprises.

Giants such as Google, Microsoft, and Facebook are in the forefront of the data center network field in the industry. Years of research and practice of these industry leaders prove that Clos architecture-based data center networks are of good scalability and provide a large quantity of equivalent paths, and therefore are being more widely deployed.

Despite an advantage of the large quantity of equivalent paths, the Clos data center network architecture is prone to serious path congestion in a conventional load balancing (LB) mechanism. FIG. 1 is a schematic diagram of a typical data center 3-stage Clos network architecture. A device at each stage may be a network device such as a switch or a router. A bottom-layer device is a shelf-top device, or referred to as a leaf device (Leaf). An intermediate-layer device is an aggregation device (Agg). A top-layer device is a core device (Core). As shown in FIG. 1, in the Clos network, there are four flows, namely a flow A, a flow B, a flow C, and a flow D. The four flows are forwarded from different source devices to different destination devices respectively. More than four paths are available in the network for forwarding of these four flows; however, forwarding paths may overlap due to a defect of the conventional load balancing mechanism. As shown in FIG. 1, a local collision occurs between the flow A and the flow B on an intermediate-layer device Agg 0. To be specific, the flow A and the flow B were supposed to pass through different paths (for example, respectively through a path Agg 0→Core 0 and a path Agg 0→Core 1) for transmission; however, both the flow A and the flow B use the path Agg 0→Core 0 for transmission due to defects of some control mechanisms. It is assumed that flow rates of both the flow A and the flow B are 6 G and a maximum flow rate that can be supported by Agg 0 is 10 G. When the flow A and the flow B both arrive at the Agg 0, a collision occurs between the flow A and the flow B on the Agg 0 because 6 G×2=12 G, exceeding 10 G. A downflow collision occurs between the flow C and the flow D in FIG. 1 on a Core 2, that is, there is only one path between the Core 2 and a downstream destination device (namely, Core 2→Agg 3), thereby inevitably resulting in the collision between the flow C and the flow D on the Core 2. Therefore, how to optimize the load balancing mechanism to avoid packet loss caused by local congestion in the network has become a focus of the industry at present.

SUMMARY

Embodiments of this application provide a transmission path determining method and apparatus, so as to effectively resolve a problem of transmission path congestion.

According to a first aspect, a transmission path determining method is provided. The method includes: determining that a current path corresponding to a flow to which a to-be-transmitted packet belongs is congested. The method also includes determining a target path for the to-be-transmitted packet based on a path congestion information table, and adding information about the target path to the to-be-transmitted packet, so as to transmit the to-be-transmitted packet based on the target path. A congestion degree of the target path is less than a congestion degree of the current path, each entry of the path congestion information table includes a transmission path and congestion information corresponding to the transmission path, and the congestion information is used to indicate a congestion degree of the transmission path; and sending the to-be-transmitted packet based on the target path.

Therefore, in this embodiment of this application, it is determined whether a transmission path is congested, and when the path is congested, a new path is determined for the to-be-transmitted packet based on the path congestion information table, so as to effectively resolve a problem of transmission path congestion.

In this embodiment of this application, the transmission path is switched only when the current path is actually congested and path switching is really necessary, thereby avoiding problems of congestion mismatch and the like. In addition, a congestion degree of a switched-to path is less than that of the current path, thereby avoiding a long-tail effect.

In addition, in this embodiment of this application, no modification may be made on a network device such as a switch and a router. All path decisions may be made by another apparatus, such as a host, and a congestion information table may be stored in the host. Therefore, a problem of a limited entry specification is resolved, and this embodiment of this application is applicable to a 3-stage Clos architecture or even an N-stage Clos architecture, where N is greater than 3.

Optionally, in an implementation of the first aspect, the determining that a current path corresponding to a flow to which a to-be-transmitted packet belongs is congested includes: determining that the flow is marked with an explicit congestion notification (ECN) when being transmitted on the current path, or that a round-trip time (RTT) corresponding to the current path is greater than a time threshold, or that the current path is faulty.

Optionally, in an implementation of the first aspect, the congestion information includes at least one of the following information: an average quantity of ECNs of the transmission path, an RTT of the transmission path, an identifier used for indicating whether the transmission path is faulty, and a quantity of flows that coexist on the transmission path.

Compared with a current system in which a congestion degree of a path is represented only by a utilization of an egress port in a period of time, in this embodiment of this application, a congestion degree of the transmission path is represented using the congestion information including parameters such as the average quantity of ECNs, the round-trip time (RTT), the identifier used for indicating whether the path is faulty, and the quantity of flows that coexist on the transmission path. Therefore, a congestion degree of a path can be more accurately evaluated, so as to guide path switching more effectively.

Optionally, in an implementation of the first aspect, before the determining a target path for the to-be-transmitted packet based on a path congestion information table, the method further includes: determining whether a flow rate of the flow to which the to-be-transmitted packet belongs is greater than a preset threshold; and if the flow rate of the flow is greater than the preset threshold, performing the step of determining a target path for the to-be-transmitted packet based on a path congestion information table.

Because a path switching operation is performed on the to-be-transmitted packet only when the flow rate exceeds the preset threshold, unnecessary switching is avoided, for example, it is totally unnecessary to split a relatively small flow.

Optionally, in an implementation of the first aspect, the determining a target path for the to-be-transmitted packet based on a path congestion information table includes: if the to-be-transmitted packet is selected based on a preset probability from the to-be-transmitted packet and other packets to be transmitted on the current path, determining the target path for the to-be-transmitted packet based on the path congestion information table, so as to transmit the to-be-transmitted packet based on the target path.

In this way, when the current path is congested, path switching is performed not for all flows in at least one flow to be transmitted on the path; instead, some flows are selected based on the preset probability, to perform path switching, thereby reducing a probability of after-switching congestion and improving a success rate of packet transmission.

Optionally, in an implementation of the first aspect, the method further includes: determining a time difference between an RTT of the target path and an RTT of the current path; and sending the to-be-transmitted packet after duration of the time difference elapses.

In order to avoid out-of-order, after the host determines that the current path corresponding to the to-be-transmitted packet is congested, and determines a new path as the target path for the flow to which the packet belongs, the host may determine the time difference between the RTT of the target path and the RTT of the current path, so that the host sends the to-be-transmitted packet after the duration equal to the time difference elapses. This can avoid packet out-of-order caused by path switching. For example, if path switching fails for a flow to which a packet 1 belongs, a fixed duration, for example, looms, needs to be waited for before a path switching operation is performed on the flow to which the packet 1 belongs.

Optionally, in an implementation of the first aspect, before the determining a target path for the to-be-transmitted packet based on a path congestion information table, the method further includes: sending a probe packet on each of at least one transmission path; receiving a response packet for the probe packet; determining, based on the response packet, congestion information corresponding to each of the at least one transmission path; and generating the path congestion information table based on the congestion information corresponding to each of the at least one transmission path.

Further, the host may further update the path congestion information table periodically or in real time. Updating the path congestion information table may be, for example, initiating periodical active detection by using an active probe, recording information such as the average quantity of ECNs and the RTT, and saving the information into the path congestion information table. Using the host as an example, a storage destination may be local space of the host, such as a memory or hard disk of the host. In addition, path level division may be further performed based on the information such as the average quantity of ECNs and the RTT, to guide path switching.

Optionally, in an implementation of the first aspect, the method further includes: if obtained congestion information of one transmission path includes an identifier indicating that the transmission path is faulty, deleting an entry corresponding to the transmission path from the path congestion information table.

To be specific, after obtaining a faulty path, the host may delete the path and related information of the path from the path congestion information table in a timely manner, and an update operation may be performed in real time on the path congestion information table. In a subsequent path selection process, a path may be selected from fault-free paths.

According to a second aspect, a transmission path determining apparatus is provided. The apparatus may be configured to perform processes in the transmission path determining method described in the foregoing first aspect and implementations. The apparatus includes a determining unit and a sending unit. The determining unit is configured to determine that a current path corresponding to a flow to which a to-be-transmitted packet belongs is congested. The determining unit is configured to determine, based on a path congestion information table, a target path for the to-be-transmitted packet, and add information about the target path to the to-be-transmitted packet, so as to transmit the to-be-transmitted packet by using the target path. A congestion degree of the target path is less than a congestion degree of the current path, each entry of the path congestion information table includes a transmission path and congestion information corresponding to the transmission path, and the congestion information is used to indicate a congestion degree of the transmission path; and the sending unit is configured to send the to-be-transmitted packet based on the target path determined by the determining unit.

According to a third aspect, a transmission path determining apparatus is provided, where the apparatus includes a transceiver, a processor, and a memory. The memory stores a program; and the processor executes the program, so as to perform processes in the transmission path determining method described in the foregoing first aspect and implementations. The processor is configured to determine that a current path corresponding to a flow to which a to-be-transmitted packet belongs is congested; and determine, based on a path congestion information table, a target path for the to-be-transmitted packet, and add information about the target path to the to-be-transmitted packet, so as to transmit the to-be-transmitted packet by using the target path. A congestion degree of the target path is less than a congestion degree of the current path, each entry of the path congestion information table includes a transmission path and congestion information corresponding to the transmission path, and the congestion information is used to indicate a congestion degree of the transmission path. The transceiver is configured to send the to-be-transmitted packet based on the target path.

According to a fourth aspect, a computer-readable storage medium is provided, where the computer-readable storage medium stores a program; and the program enables the foregoing apparatus to perform the transmission path determining method in any one of the foregoing first aspect and implementations.

Based on the foregoing technical solutions, in the embodiments of this application, it is determined whether a transmission path is congested, and when the path is congested, a new path is determined for the to-be-transmitted packet based on the path congestion information table, so as to effectively resolve a problem of transmission path congestion.

In the embodiments of this application, the transmission path is switched only when the current path is actually congested and path switching is really necessary, thereby avoiding problems of congestion mismatch and the like. In addition, because a basis of path switching is whether the current path is congested, but not relying on an arrival time difference between two packets, a long-tail effect is avoided.

In addition, in the embodiments of this application, all path decisions do not need to be made by a network device, such as a switch or a router, and information such as a congestion information table may be stored in the host. Therefore, a problem that a large-scale network cannot be supported due to a limited entry specification of the network device is resolved, and the embodiments of this application are applicable to a 3-stage Clos architecture or even an N-stage Clos architecture.

In addition, in the embodiments of this application, a new evaluation indicator is also introduced to evaluate the congestion degree of the path, for example, parameters such as the average quantity of ECNs, the round-trip time (RTT), the identifier used for indicating whether the transmission path is faulty, and the quantity of flows that coexist on the transmission path, so that the congestion degree of the path can be more accurately evaluated, to guide path switching more effectively.

DETAILED DESCRIPTION OF ILLUSTRATIVE EMBODIMENTS

Figure 1:
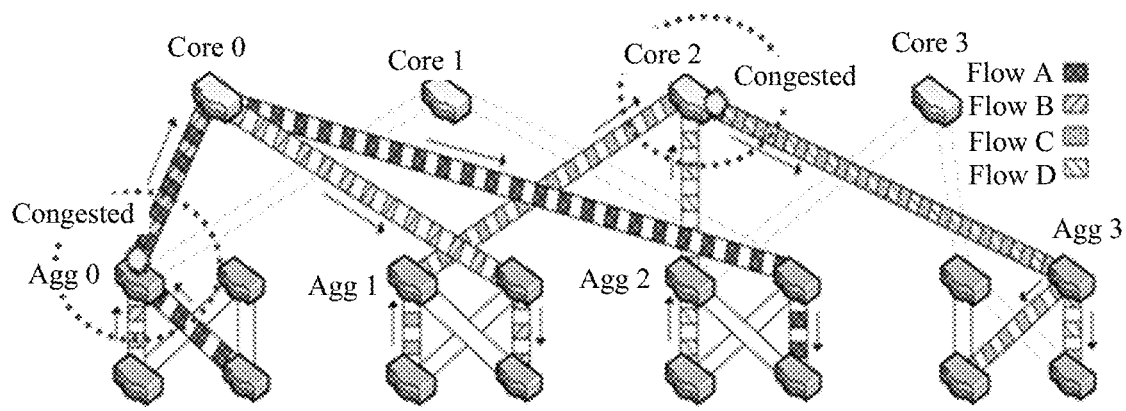
FIG. 1 is a schematic architectural diagram of packet transmission.

The following describes the technical solutions in the embodiments of this application with reference to the accompanying drawings.

It should be understood that, in the embodiments of this application, a Clos network architecture is used as an example for description, but this application is not limited thereto. A transmission path determining method proposed in the embodiments of this application may be implemented in all scenarios with equal-cost paths.

In an existing load balancing solution proposed for a 2-stage Clos, each bottom-layer device, also referred to as a leaf device (Leaf), measures congestion degrees of paths between the leaf and all other leafs in an entire network, and records the congestion degrees in a congestion information table (Congestion-To-Leaf). When a new data flow (hereinafter also referred to as "flow") is received, a current path with a minimum congestion degree is selected to forward the flow.

Herein, the 2-stage Clos is a Clos network with a 2-layer architecture, the bottom-layer device of the 2-stage Clos is usually referred to as a leaf, and a top-layer device is referred to as a spine device (Spine). Similarly, a 3-stage Clos is a Clos network with a 3-layer architecture, a bottom-layer device of the 3-stage Clos is a leaf, an intermediate-layer device is an aggregation device (Agg), and a top-layer device is referred to as a spine (or Core). An N-stage Clos is a Clos with an N-layer architecture.

In other words, a leaf is a bottom-layer device in the 2-stage Clos architecture, the 3-stage Clos architecture, and even the N-stage Clos architecture, and is usually a switch or router. An aggregation is an intermediate-layer device in the 3-stage Clos architecture. A spine is a top-layer device in the 2-stage Clos architecture, the 3-stage Clos architecture, and even the N-stage Clos architecture, and is usually a switch or router.

A flow includes a group of Transmission Control Protocol (TCP)/Internet Protocol (IP) packets that can be uniquely identified by using a specific quintuple (five key fields). For example, a user initiates Hypertext Transfer Protocol (HTTP) access from a host with a source IP address 202.100.1.2 to a web host with a destination IP address 100.1.1.2. This is a TCP flow. The other two quintuple fields of the flow are a source TCP port 20000 and a destination TCP port 8080. In this case, 202.100.1.2+100.1.1.2+TCP+20000+8080 may be used to uniquely identify this flow to be transmitted on the network.

The flow includes a plurality of packets. If an arrival time difference between two packets is greater than a configured value (for example, 500 microseconds), a latter packet may be used as a first packet of a new flowlet. If the arrival time difference between the two packets is less than the configured value, the two packets belong to a same flowlet.

During packet transmission, a source leaf first performs flowlet detection. If an arrival time difference between two packets is greater than a configured value (for example, 500 microseconds), a latter packet is used as a first packet of a new flowlet; otherwise, the two packets are considered to belong to a same flowlet. If a current packet belongs to a new flowlet, a port is searched for based on the following procedure: search a path congestion degree table (Congestion-To-Leaf table), find a destination leaf from the path congestion degree table based on a destination IP address of the packet, find, based on the destination leaf, all egress ports capable of forwarding the packet, compare congestion degrees of all the egress ports capable of forwarding the packet, and then select a port with a lowest path congestion degree to forward the packet; if the destination leaf corresponding to the destination IP address is not stored in the path congestion degree table, or congestion degree information of the destination leaf has not been established initially, randomly select one port from a plurality of egress ports available for forwarding; and if the current packet belongs to a previous flowlet, search a flowlet table and find an egress port corresponding to the flowlet from the table, to perform forwarding.

The path congestion degree table is established in two steps: forward detection and backward feedback. A forward detection process is mainly as follows. (1) When a probe packet is forwarded from the source leaf, the source leaf adds, to the probe packet, a leaf identifier, an identifier of an egress port for forwarding the probe packet in the source leaf, an identifier indicating a congestion degree of a path corresponding to the egress port, and the like. (2) When the probe packet is forwarded from the source leaf to a spine, the spine determines an egress port used for continuing to forward the probe packet; if a congestion degree of a path corresponding to the egress port is found to be greater than the congestion degree that is displayed in the probe packet received from the source leaf, the spine updates a field of the identifier used for recording the congestion degree of the path in the probe packet. (3) When the probe packet reaches a destination leaf, the destination leaf records the congestion degree that is displayed in the probe packet. (4) The destination leaf forwards the probe packet to a host.

A backward feedback process is mainly as follows. The host returns a TCP response packet for the probe packet to the source leaf; the destination leaf searches for a source leaf corresponding to a TCP response, writes, into packet content, congestion information recorded in the previous forward detection process, and performs the foregoing forwarding process. After obtaining the response packet, the source leaf extracts the path congestion information carried in the response packet. The source leaf uses the just obtained path congestion information to guide next forwarding.

It can be learned that in a packet transmission process for implementing load balancing in a current system, a main concept is to split one flow into a plurality of flowlets, and different flowlets use different transmission paths through table lookup, thereby implementing refined load balancing. FIG. 1 is used as an example. It is assumed that a flow A is a web browsing application flow with a bandwidth of 10 KB, and a flow B is a live video flow with a bandwidth of 10 MB. If scheduling is simply performed based on a flow, for example, a conventional equal-cost multi-path (ECMP) hash mechanism is used, the two flows are corresponding to two transmission paths respectively. Because bandwidths of the two flows are different, a bandwidth ratio of the two paths is 1:1000, thereby leading to unbalanced load between the two paths. When load balancing can be implemented in the foregoing manner, the flow A and the flow B may be hashed to two or more transmission paths to implement a load balancing effect, thereby avoiding transmission path congestion.

However, many problems occur in the foregoing packet transmission method for implementing load balancing. These problems directly affect the packet transmission process, and a path congestion problem in the packet transmission process cannot be effectively avoided in some cases.

First, there is an entry specification problem. The method described above is merely applicable to a 2-Stage Clos with a leaf-spine architecture. This is because a congestion information table is recorded on a leaf, and a congestion information table on each leaf records all paths from the leaf to all other leafs. As a result, entry overheads are very large. For the 2-Stage Clos, the entry specification is $O(K^2)$; however, for the 3-Stage Clos, the entry specification is $O(K^4)$, obviously exceeding a withstanding capability of a network device.

Second, there is a long-tail effect. Because flowlet splitting is based on a time difference between two packets that is greater than a configured value, when a bandwidth of a flow is relatively large, for example, gigabits per second (Gbps), the time difference between the packets is so small, being at a nanosecond (ns) level, that splitting cannot be implemented.

In addition, there is a problem of congestion mismatch. In a conventional ECMP, one flow is strictly corresponding to one path. However, in the foregoing method, one flow is split into a plurality of flowlets, different flowlets are hashed to different paths, and therefore one flow is transmitted on two or more paths at the same time. When flowlet switching is performed between two paths with different congestion degrees, the flowlet switching is always performed regardless of whether the current path is actually congested. This not only causes unnecessary switching, and may even cause a packet transmission failure.

Figure 2:
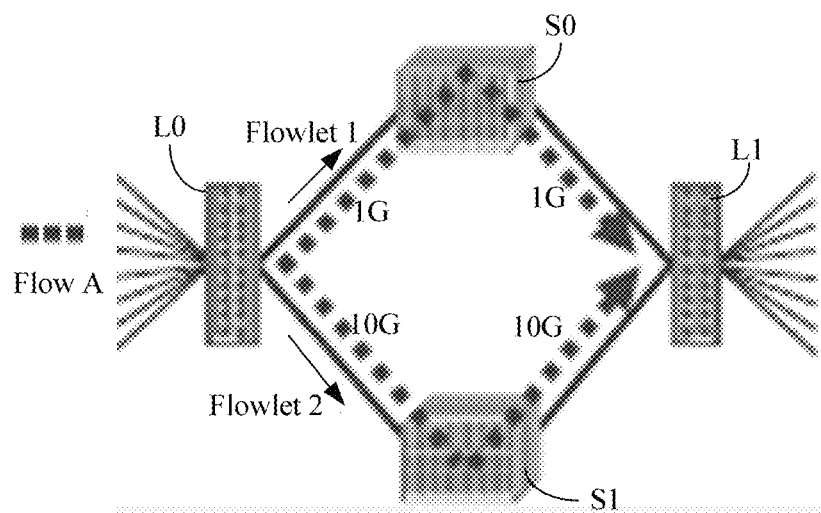
FIG. 2 is a schematic diagram of a packet transmission path for implementing load balancing.

FIG. 2 is a schematic diagram of a packet transmission path for implementing load balancing. A flow A is one flow, and a flowlet 1 and a flowlet 2 are two flowlets of the flow A. L0 and L1 are two leafs, and S0 and S1 are two spines. As shown in FIG. 2, the flow A may use two paths from the leaf 0 switch to the leaf 1 switch, namely, L0→S0→L1 and L0→S1→L1.

The flowlet 1 of the flow A first arrives at the L0. It is assumed that a rate of the flowlet 1 is 1 G, congestion degrees of both the path L0→S0→L1 and path L0→S1→L1 are 0. It is assumed that the L0 selects the path L0→S1→L1 to forward the flowlet 1.

It is assumed that a maximum flow rate that can be supported by the path L0→S1→L1 is 10 G, and L0 find that the path of L0→S1→L1 is not congested. Then, a flow rate is increased to send the flowlet 2 that follows the flowlet 1. In this case, the congestion degree of the path L0→S0→L1 is 0. However, the congestion degree of the path L0→S1→L1 becomes 1 G/10 G=10% due to forwarding of the flowlet 1. Through comparison, the L0 finds that the congestion degree of the path L0→S1→L1 is greater than that of the path L0→S0→L1. Therefore, the L0 controls to forward the flowlet 2 through the path L0→S0→L1 whose congestion degree is 0.

However, it is assumed that a maximum flow rate that can be supported by the path L0→S0→L1 is 5 G, and a flow rate of the flowlet 2 is 10 G. Because the flow rate of the flowlet 2 exceeds 5 G, the path L0→S0→L1 is congested, and consequently the flowlet 2 is discarded.

It can be learned that a disadvantage of an existing protocol stack mechanism may cause a congestion mismatch problem, that is, a switching operation performed by the flow A on two paths with different congestion degrees cannot effectively guide transmission of the flow A. What is used for guiding path switching of the flow A is to compare congestion degrees of different paths, without considering whether a specific path is actually congested for the flowlet 2.

In the embodiments of this application, a transmission path is switched only when a current path is actually congested and path switching is really necessary, thereby avoiding a problem of congestion mismatch. In addition, because a basis of path switching is whether the current path is congested, but not relying on an arrival time difference between two packets, a long-tail effect is avoided.

In the embodiments of this application, a congestion information table is stored in a host, and a path selection policy is executed by the host. This resolves a problem of an insufficient entry specification of a network device, and the embodiments of this application are applicable to a 3-stage Clos architecture or even an N-stage Clos architecture.

Further, in the embodiments of this application, a new indicator is further introduced to evaluate a congestion degree of a path. Therefore, a congestion degree of a path can be more accurately evaluated, so as to guide path switching more effectively.

Figure 3:
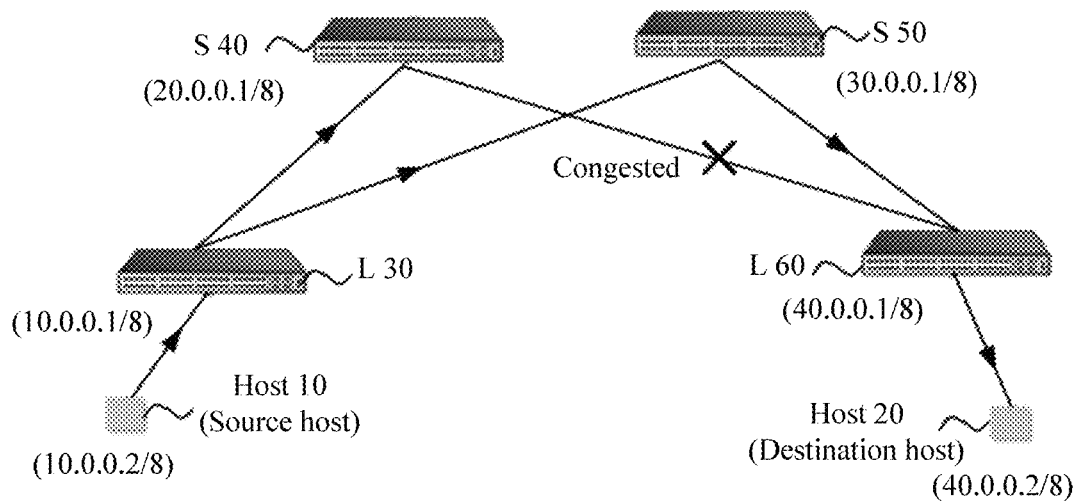
FIG. 3 is a schematic architectural diagram of a communications system to which a transmission path determining method provided in an embodiment of this application is applied.

FIG. 3 is a schematic architectural diagram of a communications system to which a transmission path determining method provided in an embodiment of this application is applied. In a Clos architecture, there is a transmission path between each leaf and all spines. FIG. 3 shows a host 10, a host 20, a leaf 30 (represented by L30), a leaf 60 (represented by L60), a spine 50 (represented by S50), and a spine 40 (represented by S40). The leaf herein is, for example, a leaf switch, and the leaf switch is connected to a host. In the communications system shown in FIG. 3, there are two transmission paths from the host 10 to the host 20, namely, Host 10→L30→S40→L60→Host 20 and Host 10→L30→S50→L60→Host 20. After the host 10 sends a packet, the packet is forwarded to the S40 by using the L30. If a path from the S40 to the L60 is congested, the S40 marks the packet with an explicit congestion notification (ECN), indicating that a flow to which the packet belongs encounters congestion on a current device. After the packet is forwarded to the host 20 by using the L60, and the host 20 learns the packet marked with a CE, the host 20 returns an explicit congestion notification echo (ECN-Echo) to the host 10. After receiving the ECN-Echo, that is, the host 10 perceives that the transmission path is congested, the host 10 reduces a transmission rate of the host 10, and sends a congestion window reduced (CWR) packet to notify the host 20 at a destination end, so as to inform the host 20 that the host 10 has performed a rate reduction operation.

It should be understood that FIG. 3 shows only a 2-stage Clos architecture including two leafs and two spines. However, the method in this embodiment of this application is also applicable to a 3-stage or higher Clos architecture. The transmission path determining method in this embodiment of this application may also be referred to as transport layer aware load balancing (TLB).

It should also be understood that all apparatuses capable of determining a transmission path by using the method described in this embodiment of this application should fall within the protection scope of this application. The following describes this embodiment of this application by using a host as an example.

In this embodiment of this application, when a transmission path is congested, the host may reselect a path based on a path congestion information table, that is, the transmission path determining method in this embodiment of this application may be implemented in an operating system of the host, and no modification needs to be made on a network device such as a switch and a router. The operating system of the host may be, for example, a network processing portion and the like in kernel code of a Windows/Linux operating system. The method in this embodiment of this application may be applied to, but not limited to TCP/IP protocol stack socket communication, an application programming interface (API), and other functional modules that interact with a network interaction part. The method in this embodiment of this application may also be applied to a virtual machine system, for example, a cloud service operating system such as VMware, a Xen virtual machine, or OpenStack, and a virtual machine monitor (Hypervisor) functional module part of a virtualized operating system.

Figure 4:
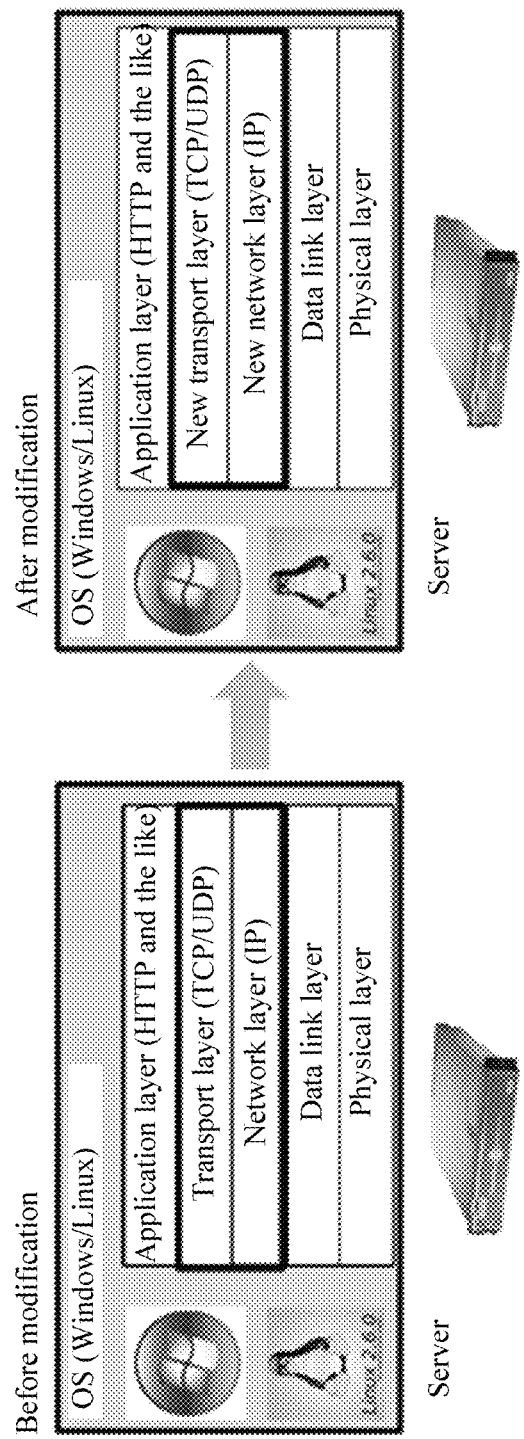
FIG. 4 is a schematic diagram of a TCP/IP protocol stack before and after modification according to an embodiment of this application.

FIG. 4 is a schematic diagram of a TCP/IP protocol stack before and after modification according to an embodiment of this application. In FIG. 4, the left figure is a schematic diagram of a TCP/IP protocol stack before modification, and the right figure is a schematic diagram of a TCP/IP protocol stack after modification. The transmission path determining method in the embodiments of this application can be implemented after proper modification is made on a transport layer and a network layer in an operating system of a host.

Path selection in this application is performed by the host, and a congestion information table is stored in the host, and not subject to an entry specification of a network device. Therefore, the method can be flexibly applicable to a 3-stage Clos architecture or even an N-stage Clos architecture.

Figure 5:
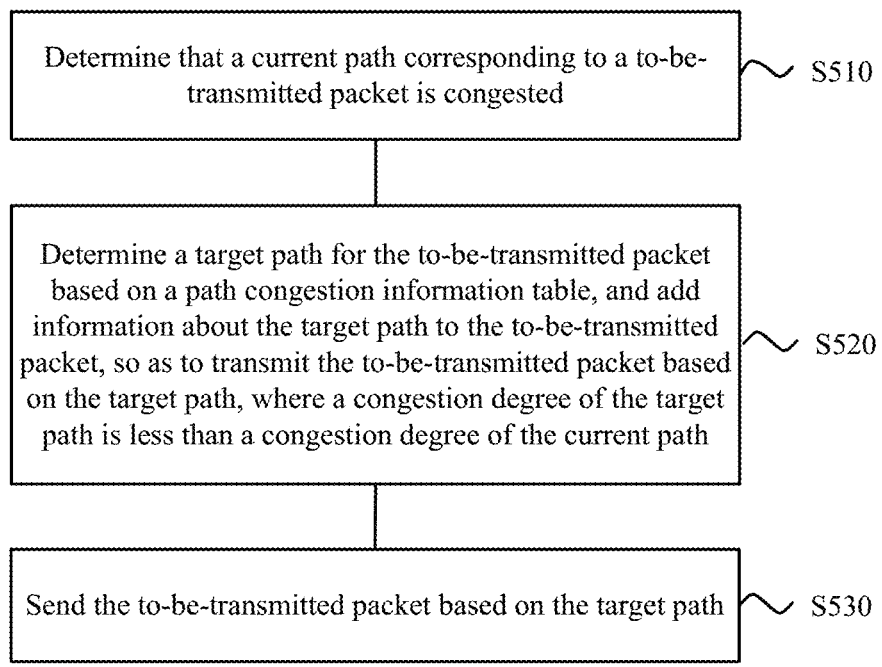
FIG. 5 is a schematic flowchart of a transmission path determining method according to an embodiment of this application.

FIG. 5 is a schematic flowchart of a transmission path determining method 500 according to an embodiment of this application. An example in which the method is executed by a host is used for description. As shown in FIG. 5, the method 500 includes the following steps.

S510: The host determines that a current path corresponding to a flow to which a to-be-transmitted packet belongs is congested.

Specifically, when the host sends a first packet of each flow, the host records, in a flow-path table, a correspondence between the flow and a forwarding path that is selected by the host for the flow. That is, each entry in the flow-path table includes a correspondence between an identifier of a flow and a forwarding path that is selected by the host for the flow.

When the host receives the to-be-transmitted packet, the host determines the flow to which the to-be-transmitted packet belongs, and then searches the flow-path table to obtain a forwarding path corresponding to the flow, where the obtained path is the current path corresponding to the flow to which the to-be-transmitted packet belongs.

S520: The host determines a target path for the to-be-transmitted packet based on a path congestion information table, and adds information about the target path to the to-be-transmitted packet, so as to transmit the to-be-transmitted packet based on the target path, where a congestion degree of the target path is less than a congestion degree of the current path.

In an implementation of this application, a forwarding path table is further configured on the host. The forwarding path table records all paths from a leaf connected to the host to any one of other leafs in the network. For example, in FIG. 2, a forwarding path table on the host 10 includes all paths from L30 to L60: L30→S40→L60 and L30→S50→L60.

That the host determines the target path for the to-be-transmitted packet based on the path congestion information table includes: the host determines a destination leaf corresponding to a destination address of the to-be-transmitted packet, and the host determines all paths from the leaf connected to the host to the destination leaf based on the forwarding path table, and selects the target path from all the paths from the leaf connected to the host to the destination leaf based on the congestion information table.

S530: The host sends the to-be-transmitted packet based on the target path.

Each entry of the path congestion information table includes an identifier of a transmission path and congestion information corresponding to the transmission path, where the congestion information is used to indicate a congestion degree of the transmission path.

In addition, the path congestion information table is stored in the host, and the path congestion information table records identifiers of a plurality of transmission paths and congestion information corresponding to each of the plurality of transmission paths. The identifier of the transmission path may be recorded as follows: for example, a destination 40.0.0.2, and switch identifiers L30, L40, and L60. This indicates that an address of a destination (for example, another host) that the transmission path is destined for is 40.0.0.2, and devices to pass through are successively L30, L40, and L60.

Optionally, congestion information of one transmission path may include at least one of the following information: an average quantity of ECNs of the transmission path, a round-trip time RTT of the transmission path, an identifier used for indicating whether the transmission path is faulty, and a quantity of flows that coexist on the transmission path.

The average quantity of ECNs indicates an average quantity of ECNs that are marked for flows transmitted within a specific time on the transmission path, for example, 100 packets are transmitted on the transmission path, and 50 packets are blocked on the transmission path. Then, the 50 packets each are marked with an ECN, and the average quantity of ECNs of the transmission path is 50/100=0.5.

Specifically, if the host determines that the current path corresponding to the to-be-transmitted packet is congested, the host may determine the target path for the to-be-transmitted packet based on the path congestion information table, and add the information about the target path to the to-be-transmitted packet, so as to transmit the to-be-transmitted packet by using the target path. The congestion degree of the target path is less than the congestion degree of the current path. Herein, the host determines the target path for the to-be-transmitted packet only when determining that the current path corresponding to the to-be-transmitted packet is actually congested, and sends the to-be-transmitted packet by using the determined target path. In addition, the to-be-transmitted packet becomes a first packet of a new flowlet of the flow to which the to-be-transmitted packet belongs.

It should be understood that the current path herein is a path to be used by the to-be-transmitted packet, that is, a path for transmitting a previous packet in the flow to which the to-be-transmitted packet belongs. If the path for transmitting the packet prior to the to-be-transmitted packet is not congested, the host continues to transmit a subsequent packet on the path. In this case, the current path of the to-be-transmitted packet is the path for transmitting the packet prior to the to-be-transmitted packet. If the path for transmitting the previous packet is congested, the host determines a new path (that is, the foregoing target path) for the flow to which the to-be-transmitted packet belongs, so as to transmit the to-be-transmitted packet on the target path, but not on the current path. The to-be-transmitted packet becomes a first packet of a new flowlet of the flow to which the to-be-transmitted packet belongs.

It can be learned that, in this embodiment of this application, whether a new flowlet is generated for a flow is determined based on whether a current transmission path is congested, but not determined based on an arrival time difference between two packets. If the current path corresponding to the flow to which the to-be-transmitted packet belongs is congested, the flow is split to generate a new flowlet. That is, the transmission path of the packet is re-determined only when the current path corresponding to the flow to which the to-be-transmitted packet belongs is congested.

In this embodiment of this application, first-time path selection in a flow transmission process may be referred to as routing, and an operation of switching a new flowlet in the flow to a path different from that of a previous flowlet may be referred to as rerouting.

Optionally, in S510, the host may determine, by using whether the flow to which the to-be-transmitted packet belongs is marked with an explicit congestion notification (ECN), the RTT of the transmission path, or the identifier indicating whether the transmission path is faulty, or the like, whether the current path is congested. To be specific, when the host determines that the flow to which the to-be-transmitted packet belongs is marked with the ECN when being transmitted on the current path, or that the round-trip time (RTT) corresponding to the current path is greater than a time threshold, or that the current path is faulty, it indicates that the current path is congested, and the host determines the target path for the to-be-transmitted packet.

That is, if the host finds that the flow to which the to-be-transmitted packet belongs is marked with the ECN when being transmitted the current path, it indicates that the current path is congested; or a time threshold may be set, and if the host finds that a time between sending of a packet and receiving of a response packet for the packet, namely the round-trip time (RTT), suddenly becomes longer and is greater than the preset time threshold, it indicates that the current path is congested; or the current path becomes faulty, and the current path is surely congested during transmission.

In addition, each time the path is congested, the host records congestion information in the path congestion information table. For example, if the host finds that a flow transmitted on a path is marked with an ECN, the host updates the average quantity of ECNs of the path in the path congestion information table. For example, it is assumed that the average quantity of ECNs of the path recorded in the path congestion information table is 50/100=0.5. If the host finds that a flow subsequently transmitted on the path is also marked with an ECN, the host updates the average quantity of ECNs of the path recorded in the path congestion information table to 51/100=0.51.

In this case, the host may query the path congestion information table, and determine the target path for the to-be-transmitted packet by using the congestion information table. The congestion degree of the target path is less than that of the current path, so that the to-be-transmitted packet may be switched to a better path for transmission. The target path determined by the host based on the path congestion information table meets at least one of the following conditions: an average quantity of ECNs of the target path is less than the average quantity of ECNs of the current path, and an RTT of the target path is less than the RTT of the current path, and a quantity of flows that coexist on the target path is less than the quantity of flows that coexist on the current path; in addition, the target path is not faulty.

Compared with the current system in which a congestion degree of a path is represented only by a utilization of an egress port in a period of time, in this embodiment of this application, a congestion degree of the transmission path is represented by using the congestion information including parameters such as the average quantity of ECNs, the round-trip time (RTT), the identifier used for indicating whether the path is faulty, and a quantity of packets that are simultaneously transmitted on the path. Therefore, a congestion degree of a path can be more accurately evaluated, so as to guide path switching more effectively.

Optionally, before that the host determines the target path for the to-be-transmitted packet based on the path congestion information table, the method further includes: the host obtains congestion information corresponding to each of at least one transmission path, and the host establishes or updates the path congestion information table based on the congestion information corresponding to each of the at least one transmission path.

Specifically, the host obtains each path that may be used for packet transmission, and congestion information of each path, so as to establish the path congestion information table. The host may send a probe packet on each of the at least one transmission path, and receive a response packet for the probe packet, so as to determine, based on the response packet, the congestion information corresponding to each of the at least one transmission path. The host generates the path congestion information table based on the congestion information corresponding to each of the at least one transmission path.

Further, after the path congestion information table is established, the host may further continuously update the path congestion information table based on a given period.

The host may obtain, in a manner of sending the probe packet, the congestion information corresponding to each path, and transmit the probe packet on a specified path by using source-routing or Xpath or in another similar manner, so as to obtain the congestion information of each path and establish the path congestion information table. The source-routing or Xpath herein is a routing policy for route selection based on a source address, and allows to implement a function of selectively sending a data packet to different destination addresses based on a plurality of different addresses.

For example, a source host may sequentially send a probe packet on all existing transmission paths by using the forward detection method described above. If congestion occurs on a device during transmission of the probe packet, the device marks the probe packet with an ECN. When the probe packet is transmitted to a destination host, the destination host learns that the path is congested, and when returning a response packet for the probe packet to the source host, adds a path congestion message to the response packet, so that the source host knows that the path is congested.

For another example, when obtaining the RTT in the congestion information of each path from the path congestion information table, the source host records a time point at which the probe packet is sent and a time point at which the response packet is received. Duration between the two time points is an RTT. A larger RTT indicates a larger congestion degree of the path.

For example, the path congestion information table may be shown as Table 1. Information recorded in each entry of Table 1 not only includes a path identifier (IDt) and a destination device (Dest) (namely, a destination host), but also includes congestion information: an average quantity of ECNs, a round-trip time (RTT), whether there is a link failure, and a quantity of flows that coexist on the transmission path.

TABLE 1

| Path identifier | Dest | Average quantity of ECNs | RTT | Link failure or not | Quantity of flows |
|---|---|---|---|---|---|
| Path A | Dest 1 | $N_1$ | $T_1$ | NO | $M_1$ |
| Path B | Dest 2 | $N_2$ | $T_2$ | NO | $M_2$ |
| Path C | Dest 3 | $N_3$ | $T_3$ | NO | $M_3$ |
| Path D | Dest 4 | $N_4$ | $T_4$ | NO | $M_4$ |
| Path E | Dest 5 | $N_5$ | $T_5$ | NO | $M_5$ |
| Path F | Dest 6 | $N_6$ | $T_6$ | NO | $M_6$ |
| Path G | Dest 7 | $N_7$ | $T_7$ | NO | $M_7$ |
| Path H | Dest 8 | $N_8$ | $T_8$ | NO | $M_8$ |

It is assumed that the path A, the path B, the path C, and the path D are used for transmitting a flow 1, the path E and the path F are used for transmitting a flow 2, and the path G and the path H are used for transmitting a flow 3. Quintuple information of flows, namely, the flow 1, the flow 2, and the flow 3, may be stored in a flow table shown in Table 2, and Table 2 also includes at least one transmission path that is likely to be used by each flow.

TABLE 2

| Flow 1 | Path A |
|---|---|
|  | Path B |
|  | Path C |
|  | Path D |
| Flow 2 | Path E |
|  | Path F |
| Flow 3 | Path G |
|  | Path H |

The host may update the path congestion information table as follows: for example, initiate periodical active detection by using an active probe, record information such as an average quantity of ECNs of each transmission path, an RTT, and an identifier indicating whether the transmission path is faulty, and save the information in the path congestion information table of the host. The host may also perform path level division based on the information, to guide path switching.

It should be noted that a large end-to-end RTT does not necessarily indicate a bad path, but may alternatively be caused by an OS processing delay of the host; a small RTT does not necessarily indicate a good path; a small average quantity of ECNs of the flow does not necessarily indicate a good path, but may be caused by an excessively large threshold or insufficient sampling of a switch; however, a large average quantity of ECNs definitely indicates a bad path.

The bad path herein may be a path with a relatively large congestion degree, and an average quantity of ECNs, an RTT, or the like of each path are mainly used as standards. For example, a larger average quantity of ECNs of a path indicates a poorer path. It is assumed that the ECN is 50/100=0.5, it indicates that 100 packets are transmitted on the transmission path, and 50 of the 100 packets each are marked with an ECN in a transmission process. This means that 50% of the packets are blocked, and obviously this path is a bad path compared to a path with an average quantity of ECNs being 0.1. For another example, if a path becomes faulty, the path is definitely a bad path and needs to be avoided.

Further, optionally, in a process in which the host obtains path congestion information, if a plurality of pieces of congestion information obtained by the host includes an identifier indicating that a path is faulty, the host deletes a transmission path corresponding to the identifier from the path congestion information table.

To be specific, after obtaining a faulty path, the host may delete the path and related information of the path from the path congestion information table in a timely manner, and an update operation may be performed in real time on the path congestion information table. In a subsequent path selection process, a path may be selected from fault-free paths.

Therefore, in this embodiment of this application, it is determined whether a transmission path is congested, and when the path is congested, a new path is determined for the to-be-transmitted packet based on the path congestion information table, so as to effectively resolve a problem of transmission path congestion.

In this embodiment of this application, the transmission path is switched only when the current path is actually congested and path switching is really necessary, thereby avoiding problems of congestion mismatch and the like. In addition, because a basis of path switching is whether the current path is congested, but not relying on an arrival time difference between two packets, a long-tail effect is avoided.

In addition, all path decision is made by the host, and the congestion information table is stored in the host. This resolves a problem of an insufficient entry specification of the network device, and this embodiment of this application is applicable to the 3-stage Clos architecture or even the N-stage Clos architecture.

In addition, in this embodiment of this application, a new indicator is introduced to evaluate a congestion degree of a path, and the congestion degree of the path can be more accurately evaluated, thereby guiding path switching more effectively.

Optionally, in S520, that the host determines the target path for the to-be-transmitted packet based on the path congestion information table includes: if the to-be-transmitted packet is selected based on a preset probability from the to-be-transmitted packet and other packets to be transmitted on the current path, the host determines the target path for the to-be-transmitted packet based on the path congestion information table, so as to transmit the to-be-transmitted packet based on the target path.

For example, it is assumed that all current paths of a packet 1, a packet 2, and a packet 3 that are to be transmitted and that belong to different flows are a path 1, that is, the three packets are to be transmitted on the path 1. If the path 1 is congested at that time, a target path needs to be reselected separately for a flow 1 to which the packet 1 belongs to, a flow 2 to which the packet 2 belongs to, and a flow 3 to which the packet 3 belongs to. However, during selection of a new transmission path, the host does not switch a transmission path for all the flow 1, the flow 2, and the flow 3, but performs path switching only for one or two of the three flows. For example, a probability of ⅓ is preset, indicating that path switching is performed only for one of the three flows. For example, a server of the flow 1 performs path switching for the flow 1, and determines, based on a path congestion information table, a target path for the packet 1 of the flow 1 and uses the target path as a new transmission path, but not performing path switching for the flow 2 and the flow 3, so that the packet 2 in the flow 2 and the packet 3 in the flow 3 are to be still transmitted on the current path. In this way, an advantage is that a probability of after-switching re-congestion is reduced. If only the path 1 and a path 2 exist, and switching is performed simultaneously for the three flows, the flow 1, the flow 2, and the flow 3 are all switched to the path 2, and a collision still occurs possibly between the packet 1, the packet 2, and the packet 3. In this embodiment, a case in which a plurality of flows are simultaneously switched to a same path to cause congestion of the path can be properly avoided, thereby effectively implementing load balancing between different transmission paths, reducing the probability of after-switching re-congestion, and improving a success rate of packet transmission.

For determining to perform path switching for which flow of the flow 1, the flow 2, and the flow 3, random selection may be performed, or a random number may be generated to check whether the random number can be divided by 3, and if the random number can be divided by 3, path switching is performed; otherwise, path switching is not performed. Alternatively, one or two flows with a highest flow rate may be selected for path switching. This is not limited in this embodiment of this application.

In addition, if switching is unsuccessful at a time, switching may be performed again after a short delay, to increase a re-switching success rate. For example, if path switching fails for the flow 1 to which the packet 1 belongs, fixed duration, for example, looms, needs to be waited for before a path switching operation is performed on the flow 1.

Optionally, in S520, that the host determines the target path for the to-be-transmitted packet based on the path congestion information table may further include: if a flow rate of the flow corresponding to the to-be-transmitted packet is greater than a preset threshold, the host determines the target path for the to-be-transmitted packet based on the path congestion information table.

Specifically, an object selected by the host may be a flow whose flow rate exceeds a specific value, and the host performs a path switching operation on the flow only when the flow rate of the flow exceeds a specific threshold. When the current path corresponding to the flow to which the to-be-transmitted packet belongs is congested, the host perceives a flow rate of the flow, for example, calculating a TCP send window rate based on the RTT when there is no packet loss, or calculating a TCP send window rate based on a packet loss rate and a TCP throughput formula when there is packet loss. A path switching operation is performed for the flow to which the to-be-transmitted packet belongs only when the flow rate of the flow exceeds the preset threshold. Otherwise, path switching is not performed because a flow with a relatively small flow rate does not need to be split, thereby avoiding unnecessary path switching.

Optionally, the method may further include: the host determines a time difference between the RTT of the target path and the RTT of the current path; and the host sends the to-be-transmitted packet after waiting for duration equal to the time difference.

A problem likely to occur after path switching is packet out-of-order. For example, the flow A is divided into a flowlet 1, a flowlet 2, and a flowlet 3, the flowlet 1 and the flowlet 2 are transmitted on the path 1, and the flowlet 3 is switched to the path 2. If the flowlet 3 reaches a destination device before the flowlet 1 and the flowlet 2 because a congestion degree of the path 2 is less than that of the path 1, a sequence of packets in the flow A changes from an original flowlet 1→flowlet 2→flowlet 3 to flowlet 3→flowlet 1→flowlet 2, indicating out-of-order.

In order to avoid out-of-order, after the host determines that the current path corresponding to the flow to which the to-be-transmitted packet belongs is congested, and determines a new path as the target path for the packet, the host may determine the time difference between the RTT of the target path and the RTT of the current path, so that the host sends the to-be-transmitted packet after the duration equal to the time difference elapses. This can avoid packet out-of-order caused by path switching.

Figure 6:
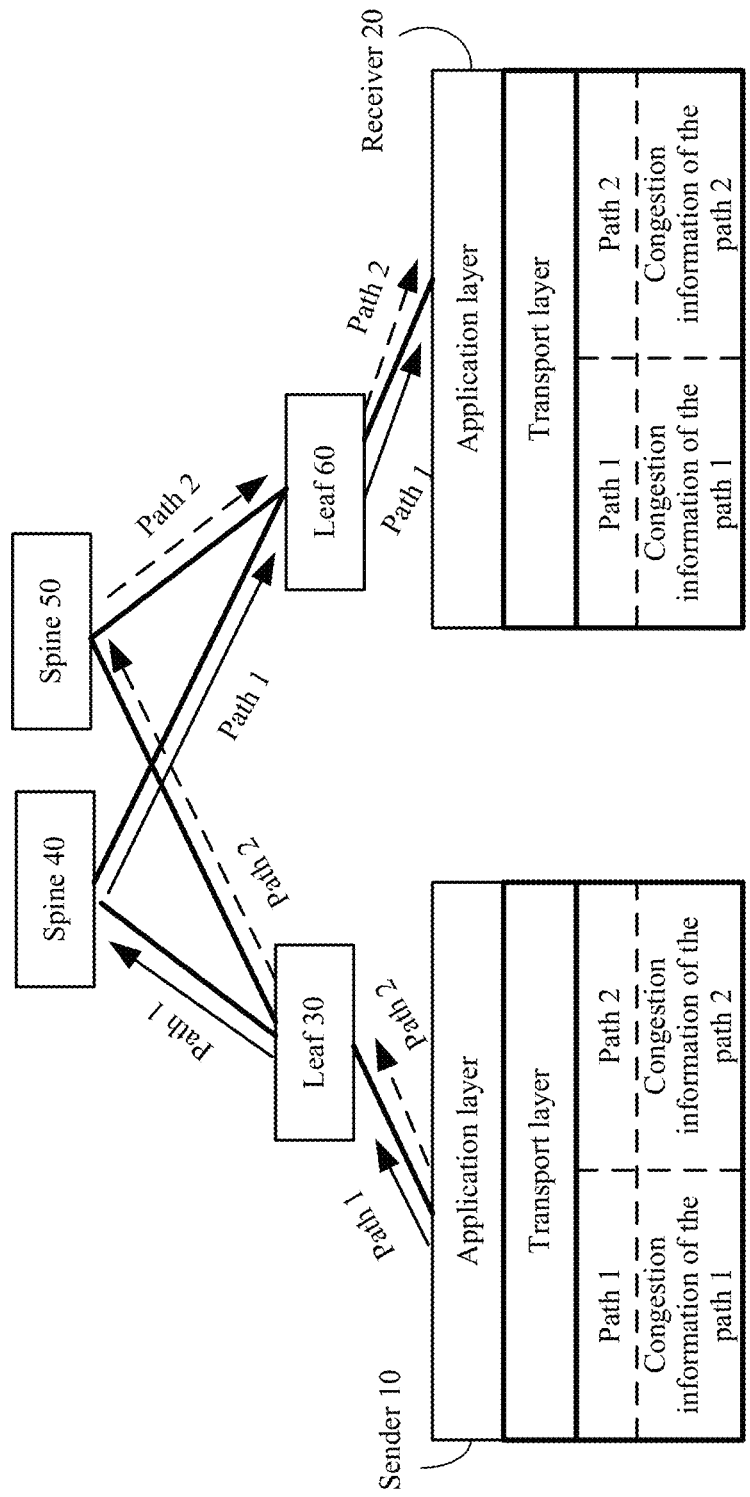
FIG. 6 is a schematic diagram of path switching according to an embodiment of this application.

With reference to FIG. 6, the following describes in detail a transmission path determining method in an embodiment of this application. FIG. 6 is a schematic diagram of path switching according to the method in this embodiment of this application. A sender 10, a receiver 20, a leaf 30, a spine 40, a spine 50, and a leaf 60 are included. As shown in FIG. 6, there are two transmission paths between the sender 10 and the receiver 20, namely a path 1 and a path 2. A flow to be transmitted is a flow A. It is assumed that the flow A is divided into two flowlets, namely, a flowlet 1 and a flowlet 2. A transport layer of a host of the sender 10 is capable of implementing transport layer-aware load balancing TLB, and a transport layer of a host of the receiver 20 is also capable of implementing transport layer-aware load balancing TLB. The transmission path determining method specifically includes the following.

(1) When a new flow needs to be transmitted, the host records a quintuple of the flow in a flow table.

(2) First-time routing operation (Route): The host searches a path congestion information table for the new flow, and randomly selects a transmission path from paths other than a bad path, where the bad path may be determined by the host by using information such as an average quantity of ECNs and an RTT in the foregoing manner. As shown in FIG. 6, the host first selects the path 1 for the flowlet 1 of the flow A, to send a packet.

(3) The flowlet 1 is sent successfully on the path 1, and the host continues to send the flowlet 2 of the flow A on the path 1.

(4) The path 1 is congested, and the host determines whether to perform a re-routing operation for the flow A.

That the path 1 is congested may be: the host 10 of the sender determines that the flow A is marked with an ECN when being transmitted on the path 1, that an average quantity of ECNs of the path 1 is greater than a preset value, that an RTT of the path 1 exceeds a preset threshold, or that a link failure occurs on the path 1.

The host may determine whether to perform a rerouting operation for the flowlet 2 based on a flow rate of the flow A. When the flow rate is greater than a preset threshold, the host performs re-routing for the flow A; otherwise, the host selects a next flow and checks whether the next flow meets a requirement. The host may alternatively determine, based on a preset probability value, whether to perform a rerouting operation for the flow A.

(5) When determining that a rerouting operation needs to be performed for the flow A, the host determines, based on the path congestion information table, a target path for transmitting the flowlet 2 of the flow A.

The host searches the path congestion information table, selects the target path such as the path 2 herein, and adds information about the path 2 to the flowlet 2, so as to transmit the flowlet 2 based on the path 2. The path 2 satisfies at least one of the following conditions: an average quantity of ECNs of the path 2 is less than the average quantity of ECNs of the path 1, an RTT of the path 2 is less than the RTT of the path 1, and a quantity of simultaneously transmitted packets on the path 2 is less than a quantity of simultaneously transmitted packets on the path 1.

(6) The host determines a time difference between the RTT of the path 1 and the RTT of the path 2.

The host calculates the time difference between the RTT of the path 1 and the RTT of the path 2, for example, mous.

(7) After the host temporarily stores the flowlet 2 locally for mous, the host sends the flowlet 2 on the path 2.

In this way, when the path is congested, the host determines a new path for the to-be-transmitted packet based on the path congestion information table, thereby effectively resolving a problem of transmission path congestion.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

Figure 7:
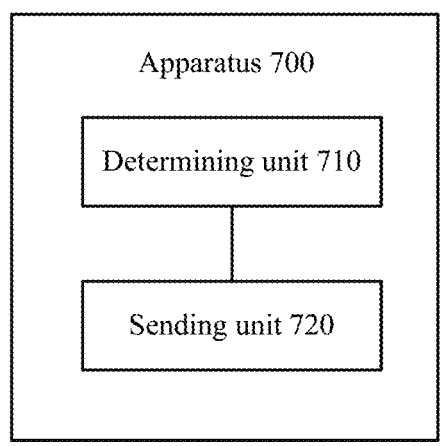
FIG. 7 is a schematic block diagram of a transmission path determining apparatus according to an embodiment of this application.

With reference to FIG. 7, the following describes a transmission path determining apparatus according to an embodiment of the present invention. Technical features described in the method embodiments may be applicable to the following apparatus embodiment.

FIG. 7 shows a transmission path determining apparatus 700 according to an embodiment of this application. The apparatus 700 shown in FIG. 7 includes a determining unit 710 and a sending unit 720.

The determining unit 710 is configured to determine that a current path corresponding to a flow to which a to-be-transmitted packet belongs is congested; and determine, based on a path congestion information table, a target path for the to-be-transmitted packet, and add information about the target path to the to-be-transmitted packet, so as to transmit the to-be-transmitted packet by using the target path, where a congestion degree of the target path is less than a congestion degree of the current path, each entry of the path congestion information table includes a transmission path and congestion information corresponding to the transmission path, and the congestion information is used to indicate a congestion degree of the transmission path.

The sending unit 720 is configured to send the to-be-transmitted packet based on the target path determined by the determining unit.

Therefore, the transmission path determining apparatus in this embodiment of this application determines whether a transmission path is congested, and when the path is congested, determines a new path for the to-be-transmitted packet based on the path congestion information table, so as to effectively resolve a problem of transmission path congestion.

In this embodiment of this application, the transmission path is switched only when the current path is actually congested and path switching is really necessary, thereby avoiding problems of congestion mismatch and the like. In addition, a congestion degree of a switched-to path is less than that of the current path, thereby avoiding a long-tail effect.

In addition, in this embodiment of this application, all path decision may be made by another apparatus such as the host, with no need to be performed by a network device, such as a switch or a router. Information such as a congestion information table may also be stored in the host. Therefore, a problem of a limited entry specification is resolved, and this embodiment of this application is applicable to a 3-stage Clos architecture or even an N-stage Clos architecture.

In addition, in this embodiment of this application, a new evaluation indicator is also introduced to evaluate the congestion degree of the path, for example, parameters such as the average quantity of ECNs, the round-trip time (RTT), the identifier used for indicating whether the transmission path is faulty, and the quantity of flows that coexist on the transmission path, so that the congestion degree of the path can be more accurately evaluated, to guide path switching more effectively.

Optionally, the determining unit 710 is specifically configured to determine that the flow is marked with an explicit congestion notification (ECN) when being transmitted on the current path, or that a round-trip time (RTT) corresponding to the current path is greater than a time threshold, or that the current path is faulty.

Optionally, the congestion information includes at least one of the following information: an average quantity of ECNs of the transmission path, a round-trip time (RTT) of the transmission path, an identifier used for indicating whether the transmission path is faulty, and a quantity of flows that coexist on the transmission path.

Optionally, if a flow rate of the flow corresponding to the to-be-transmitted packet is greater than a preset threshold, the target path is determined for the to-be-transmitted packet based on the path congestion information table.

Optionally, the determining unit 710 is specifically configured to: if the to-be-transmitted packet is selected based on a preset probability from the to-be-transmitted packet and other packets to be transmitted on the current path, determine the target path for the to-be-transmitted packet based on the path congestion information table, so as to transmit the to-be-transmitted packet based on the target path.

Optionally, the determining unit 710 is further configured to determine a time difference between an RTT of the target path and an RTT of the current path; and the sending unit is further configured to send the to-be-transmitted packet after duration of the time difference elapses.

Optionally, the apparatus further includes a receiving unit. The sending unit 720 is further configured to send a probe packet on each of at least one transmission path; the receiving unit is further configured to receive a response packet for the probe packet; the determining unit is further configured to determine, based on the response packet, congestion information corresponding to each of the at least one transmission path; and the determining unit is further configured to generate the path congestion information table based on the congestion information corresponding to each of the at least one transmission path.

Optionally, the determining unit is further configured to: if obtained congestion information of one transmission path includes an identifier indicating that the transmission path is faulty, delete an entry corresponding to the transmission path from the path congestion information table.

Figure 8:
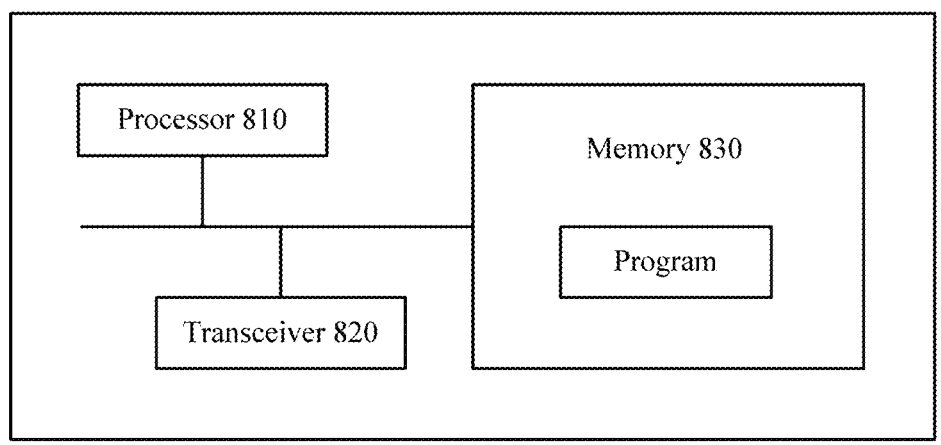
FIG. 8 is a schematic structural diagram of a transmission path determining apparatus according to an embodiment of this application.

FIG. 8 shows a structure of a transmission path determining apparatus according to an embodiment of this application. The apparatus includes a processor 810, a transceiver 820, and a memory 830. The processor 810, the transceiver 820, and the memory 830 communicate with each other by using an internal connection path. The memory 830 is configured to store an instruction. The processor 810 is configured to execute the instruction stored in the memory 830, so as to control the transceiver 820 to receive a signal or send a signal.

The processor 810 is configured to determine a target path for the to-be-transmitted packet based on a path congestion information table, and adding information about the target path to the to-be-transmitted packet, so as to transmit the to-be-transmitted packet by using the target path, where a congestion degree of the target path is less than a congestion degree of the current path, each entry of the path congestion information table includes a transmission path and congestion information corresponding to the transmission path, and the congestion information is used to indicate a congestion degree of the transmission path.

The transceiver 820 is configured to send the to-be-transmitted packet based on the target path determined by the processor 810.

Therefore, the transmission path determining apparatus in this embodiment of this application determines whether a transmission path is congested, and when the path is congested, determines a new path for the to-be-transmitted packet based on the path congestion information table, so as to effectively resolve a problem of transmission path congestion.

Optionally, the processor 810 is specifically configured to determine that the flow is marked with an explicit congestion notification (ECN) when being transmitted on the current path, or that a round-trip time (RTT) corresponding to the current path is greater than a time threshold, or that the current path is faulty.

Optionally, the congestion information includes at least one of the following information: an average quantity of ECNs of the transmission path, a round-trip time (RTT) of the transmission path, an identifier used for indicating whether the transmission path is faulty, and a quantity of flows that coexist on the transmission path.

Optionally, if a flow rate of the flow corresponding to the to-be-transmitted packet is greater than a preset threshold, the target path is determined for the to-be-transmitted packet based on the path congestion information table.

Optionally, the processor 810 is specifically configured to: if the to-be-transmitted packet is selected based on a preset probability from the to-be-transmitted packet and other packets to be transmitted on the current path, determine the target path for the to-be-transmitted packet based on the path congestion information table, so as to transmit the to-be-transmitted packet based on the target path.

Optionally, the processor 810 is further configured to determine a time difference between an RTT of the target path and an RTT of the current path; and the transceiver 820 is further configured to send the to-be-transmitted packet after duration of the time difference elapses.

Optionally, the transceiver 820 is further configured to send a probe packet on each of at least one transmission path; and the transceiver 820 is further configured to receive a response packet for the probe packet. The processor 810 is further configured to determine, based on the response packet, congestion information corresponding to each of the at least one transmission path; and the processor 810 is further configured to generate the path congestion information table based on the congestion information corresponding to each of the at least one transmission path.

Optionally, the processor 810 is further configured to: if obtained congestion information of one transmission path includes an identifier indicating that the transmission path is faulty, delete an entry corresponding to the transmission path from the path congestion information table.

It should be understood that, in this embodiment of this application, the processor 810 may be a central processing unit (CPU), or the processor 810 may be any other general-purpose processor, a digital signal processor (DSP), an application specific integrated circuit (ASIC), a field-programmable gate array (FPGA), any other programmable logic device, a discrete gate or transistor logic device, a discrete hardware component, or the like. The general-purpose processor may be a microprocessor, or the processor may be any conventional processor or the like.

The memory 830 may include a read-only memory and a random access memory, and provide instructions and data for the processor 810. A part of the memory 830 may further include a non-volatile random access memory. For example, the memory 830 may further store device type information. It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In an implementation process, the steps of the methods may be implemented by an integrated logical circuit of hardware in the processor 810, or by a software instruction. The steps of the methods disclosed with reference to the embodiments of this application may be directly implemented by a hardware processor, or may be implemented by a combination of hardware in the processor 810 and a software module. The software module may be located in a storage medium that is mature in the art, such as a random access memory, a flash memory, a read-only memory, a programmable read-only memory, an electrically erasable programmable memory, or a register. The storage medium is located in the memory 830, and the processor 810 reads information from the memory 830 and implements the steps of the foregoing methods in combination with hardware of the processor 810. To avoid repetition, details are not described herein again.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the embodiments of this application essentially, or the part contributing to the prior art, or some of the technical solutions may be implemented in a form of a software product. The software product is stored in a storage medium, and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of the embodiments of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
   determining that a current path is congested, wherein the current path corresponds to a flow to which a to-be-transmitted packet belongs;
   determining a target path for the to-be-transmitted packet based on a path congestion information table, wherein each entry of the path congestion information table comprises a respective transmission path and respective congestion information corresponding to the respective transmission path, the respective congestion information of each entry indicates a respective congestion degree of the respective transmission path, and the respective congestion information of each entry comprises an average quantity of explicit congestion notifications (ECNs) of the respective transmission path corresponding to the respective entry;
   adding information about the target path to the to-be-transmitted packet, wherein a congestion degree of the target path is less than a congestion degree of the current path; and
   sending the to-be-transmitted packet based on the target path.

2. The method according to claim 1, wherein determining that the current path is congested comprises:
   determining that the flow is marked with at least one ECN when being transmitted on the current path, or that a round-trip time (RTT) corresponding to the current path is greater than a time threshold, or that the current path is faulty.

3. The method according to claim 1, wherein the congestion information of each entry further comprises:
   a round-trip-time (RTT) of the respective transmission path corresponding to the respective entry, an identifier indicating whether the respective transmission path corresponding to the respective entry is faulty, or a quantity of flows that coexist on the respective transmission path corresponding to the respective entry.

4. The method according to claim 1, further comprising:
before determining the target path for the to-be-transmitted packet based on the path congestion information table, determining whether a flow rate of the flow to which the to-be-transmitted packet belongs is greater than a preset threshold; and
wherein determining the target path for the to-be-transmitted packet based on the path congestion information table comprises:
when the flow rate of the flow is greater than the preset threshold, determining the target path for the to-be-transmitted packet based on the path congestion information table.

5. The method according to claim 1, wherein determining the target path for the to-be-transmitted packet based on the path congestion information table comprises:
when the to-be-transmitted packet is selected from a group comprising the to-be-transmitted packet and other packets to be transmitted on the current path, determining the target path for the to-be-transmitted packet based on the path congestion information table, wherein the to-be transmitted packet is selected based on a preset ratio that indicates a ratio of traffic on the current path to be switched to another path when the current path is congested.

6. The method according to claim 1, further comprising:
determining a time difference between a round-trip-time (RTT) of the target path and an RTT of the current path; and
sending the to-be-transmitted packet after duration of the time difference elapses.

7. The method according to claim 1, further comprising:
before determining the target path for the to-be-transmitted packet based on the path congestion information table, sending a probe packet on each transmission path of at least one transmission path;
for each probe packet, receiving a response packet corresponding to the respective probe packet;
for each probe packet, determining, based on the corresponding response packet, respective congestion information corresponding to the respective transmission path on which the respective probe packet is sent; and
generating the path congestion information table based on the respective congestion information corresponding to each transmission path of the at least one transmission path.

8. The method according to claim 7, further comprising:
when obtained congestion information of a first transmission path of the at least one transmission path comprises an identifier indicating that the first transmission path is faulty, deleting an entry corresponding to the first transmission path from the path congestion information table.

9. An apparatus, comprising:
a processor, configured to:
determine that a current path is congested, wherein the current path corresponds to a flow to which a to-be-transmitted packet belongs;
determine, based on a path congestion information table, a target path for the to-be-transmitted packet, wherein each entry of the path congestion information table comprises a respective transmission path and respective congestion information corresponding to the respective transmission path, the respective congestion information of each entry indicates a respective congestion degree of the respective transmission path, and the respective congestion information of each entry comprises an average quantity of explicit congestion notifications (ECNs) of the respective transmission path corresponding to the respective entry; and
add information about the target path to the to-be-transmitted packet, wherein a congestion degree of the target path is less than a congestion degree of the current path; and
a transmitter, configured to send the to-be-transmitted packet based on the target path determined by the processor.

10. The apparatus according to claim 9, wherein the processor is configured to:
determine that the flow is marked with at least one ECN when being transmitted on the current path, or that a round-trip time (RTT) corresponding to the current path is greater than a time threshold, or that the current path is faulty.

11. The apparatus according to claim 9, wherein the congestion information of each entry further comprises:
a round-trip time (RTT) of the respective transmission path corresponding to the respective entry, an identifier used for indicating whether the respective transmission path corresponding to the respective entry is faulty, and a quantity of flows that coexist on the respective transmission path corresponding to the respective entry.

12. The apparatus according to claim 9, wherein the processor is configured to:
when a flow rate of the flow corresponding to the to-be-transmitted packet is greater than a preset threshold, determine the target path for the to-be-transmitted packet based on the path congestion information table.

13. The apparatus according to claim 9, wherein the processor is configured to:
when the to-be-transmitted packet is selected from a group comprising the to-be-transmitted packet and other packets to be transmitted on the current path, determine the target path for the to-be-transmitted packet based on the path congestion information table, wherein the to-be transmitted packet is selected based on a preset ratio that indicates a ratio of traffic on the current path to be switched to another path when the current path is congested.

14. The apparatus according to claim 9, wherein the processor is further configured to:
determine a time difference between an round-trip-time (RTT) of the target path and an RTT of the current path; and
wherein the transmitter is configured to send the to-be-transmitted packet after duration of the time difference elapses.

15. The apparatus according to claim 9, wherein:
the apparatus further comprises a receiver;
the transmitter is further configured to send a probe packet on each transmission path of at least one transmission path;
the receiver is further configured to, for each probe packet, receive a respective response packet corresponding to the respective probe packet;
the transmitter is further configured to, for each probe packet, determine, based on the corresponding response packet, respective congestion information corresponding to the respective transmission path on which the respective probe packet is sent; and
the processor is further configured to generate the path congestion information table based on the congestion information corresponding to each transmission path of the at least one transmission path.

16. The apparatus according to claim 15, wherein the processor is further configured to:
when obtained congestion information of a first transmission path of the at least one transmission path comprises an identifier indicating that the first transmission path is faulty, delete an entry corresponding to the first transmission path from the path congestion information table.

17. A non-transitory computer-readable storage medium comprising instructions which, when executed by a computer, cause the computer to:
determine that a current path is congested, wherein the current path corresponds to a flow to which a to-be-transmitted packet belongs;
determine a target path for the to-be-transmitted packet based on a path congestion information table, wherein each entry of the path congestion information table comprises a respective transmission path and respective congestion information corresponding to the respective transmission path, the respective congestion information of each entry indicates a respective congestion degree of the respective transmission path, and the respective congestion information of each entry comprises an average quantity of explicit congestion notifications (ECNs) of the respective transmission path corresponding to the respective entry;
add information about the target path to the to-be-transmitted packet, wherein a congestion degree of the target path is less than a congestion degree of the current path; and
send the to-be-transmitted packet based on the target path.

18. The non-transitory computer-readable storage medium according to claim 17, wherein determining that the current path is congested comprises:
determining that the flow is marked with at least one ECN when being transmitted on the current path, or that a round-trip time (RTT) corresponding to the current path is greater than a time threshold, or that the current path is faulty.

19. The non-transitory computer-readable storage medium according to claim 17, wherein the congestion information of each entry further comprises:
a round-trip-time (RTT) of the respective transmission path corresponding to the respective entry, an identifier indicating whether the respective transmission path corresponding to the respective entry is faulty, and a quantity of flows that coexist on the respective transmission path corresponding to the respective entry.

20. The non-transitory computer-readable storage medium according to claim 17, wherein the instructions which, when executed by a computer, further cause the computer to:
before determining the target path for the to-be-transmitted packet based on the path congestion information table, determine whether a flow rate of the flow to which the to-be-transmitted packet belongs is greater than a preset threshold; and
wherein determining the target path for the to-be-transmitted packet based on the path congestion information table comprises:
when the flow rate of the flow is greater than the preset threshold, determining the target path for the to-be-transmitted packet based on the path congestion information table.

* * * * *